March 7, 1967 H. BEDDOES 3,307,579
MULTI-WAY INDEXING VALVE
Filed April 11, 1963 4 Sheets-Sheet 1
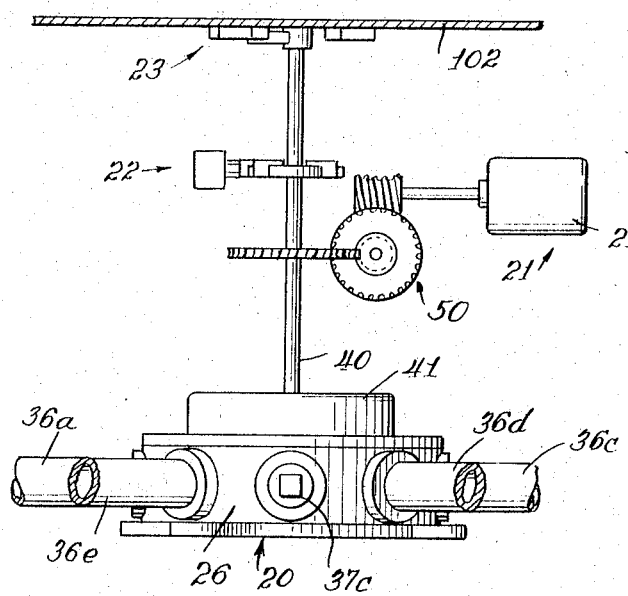
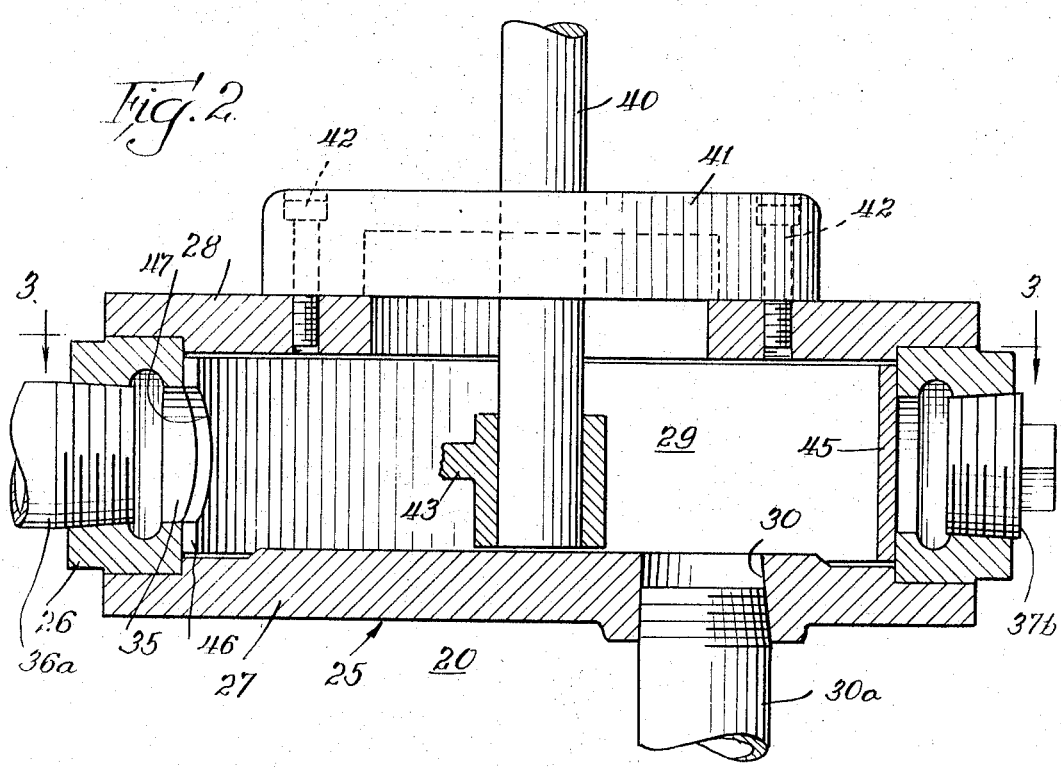
INVENTOR.
Hubert Beddoes
BY
Fidler, Boadsley, Bradley,
Patraude & Petherbridge att'ys

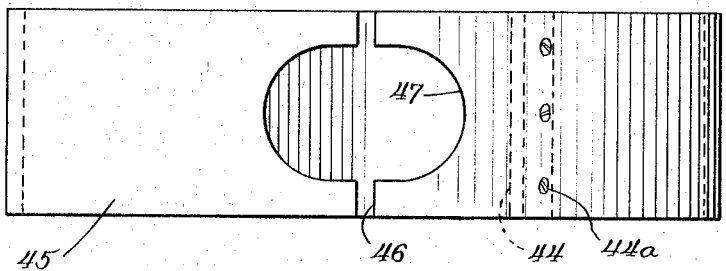
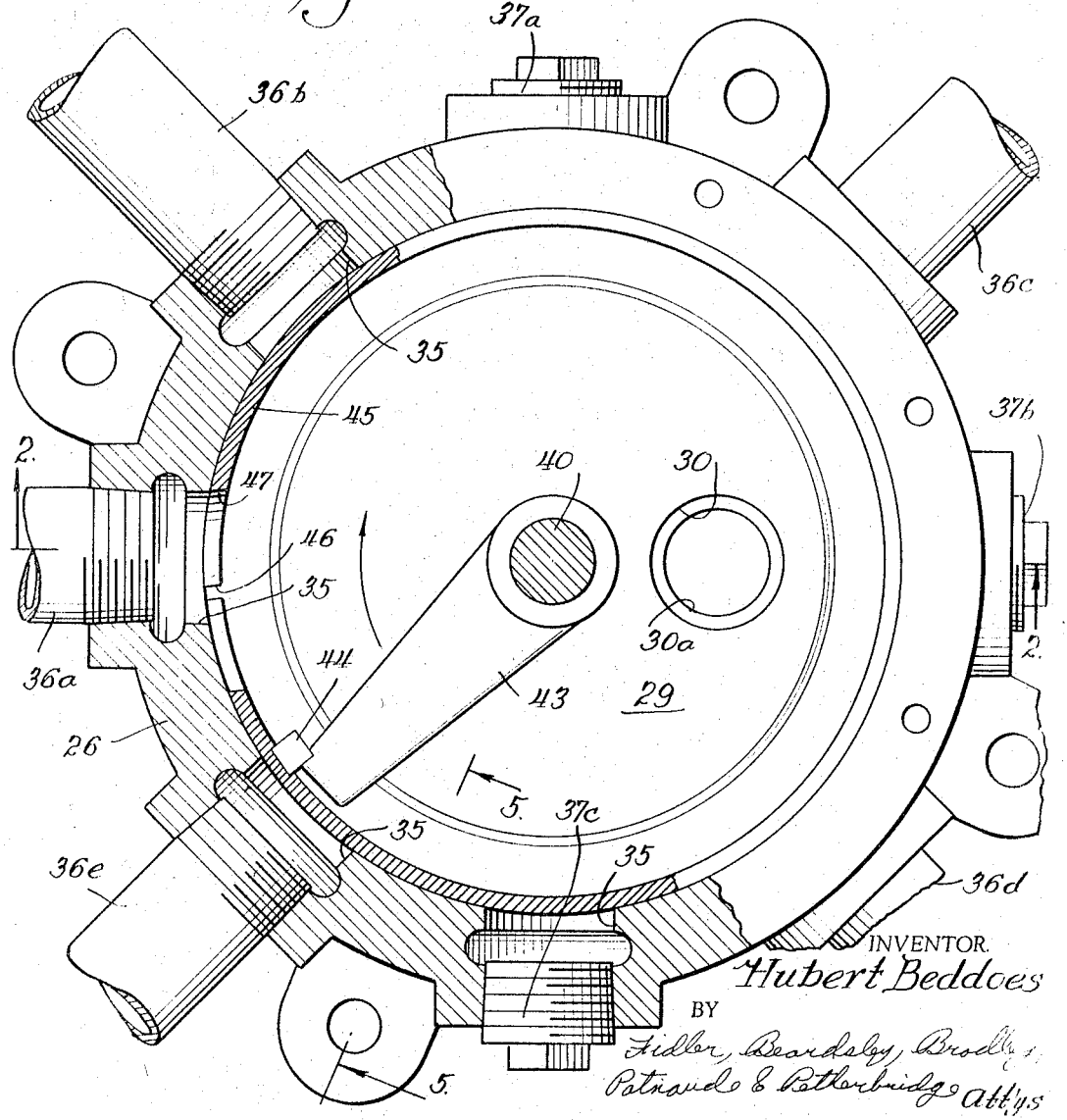

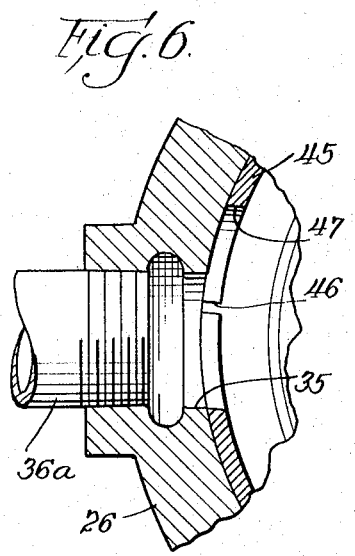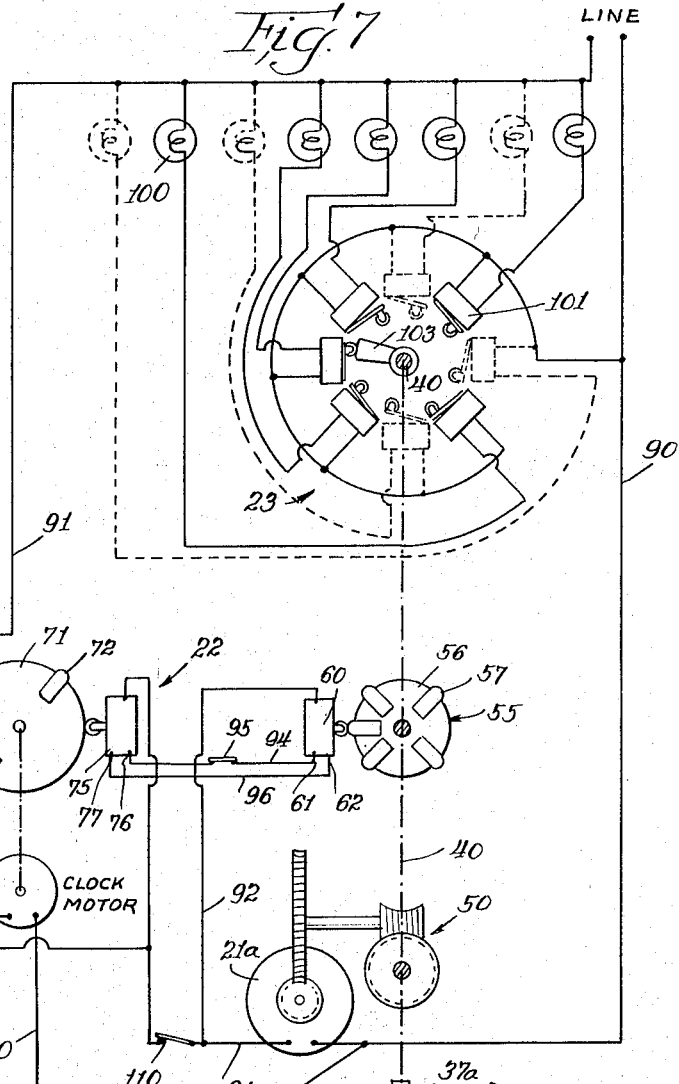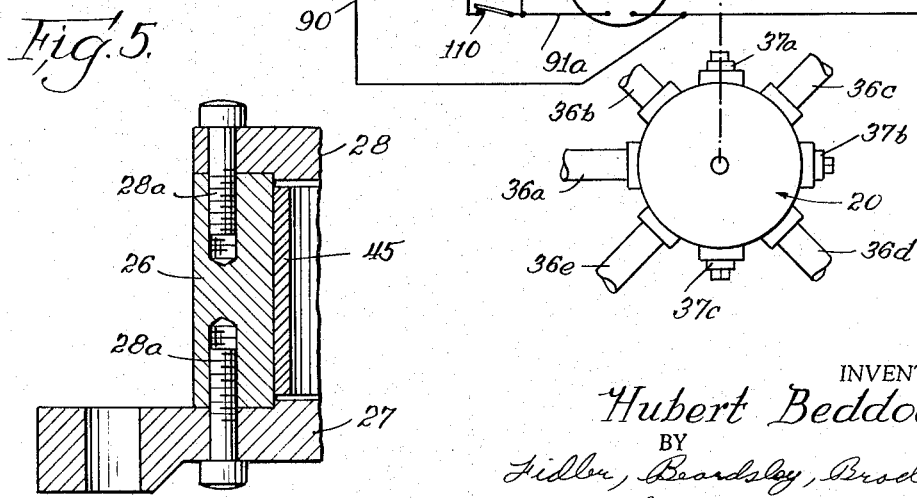

March 7, 1967  H. BEDDOES  3,307,579
MULTI-WAY INDEXING VALVE
Filed April 11, 1963  4 Sheets-Sheet 4
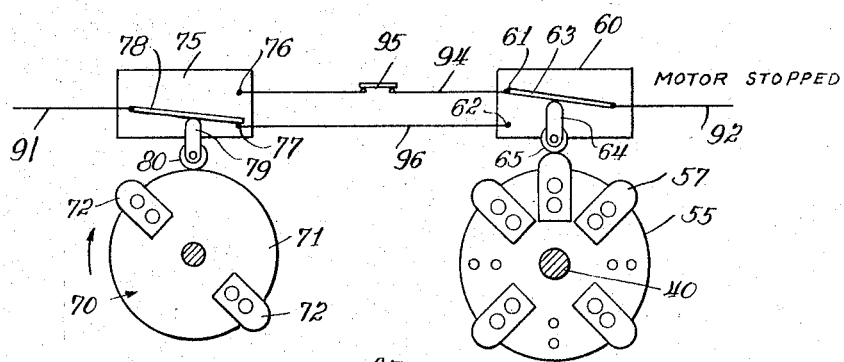
Fig. 8.
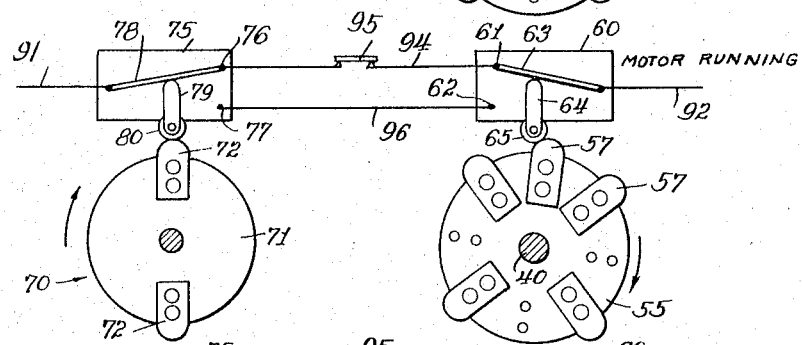
Fig. 9.
Fig. 10.
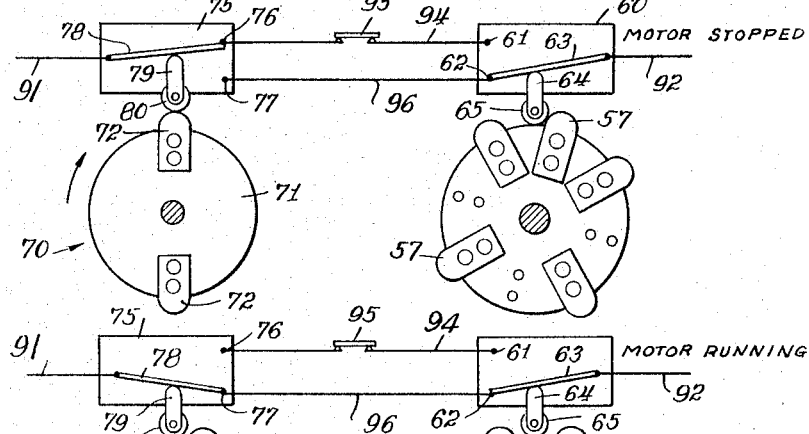
Fig. 11.
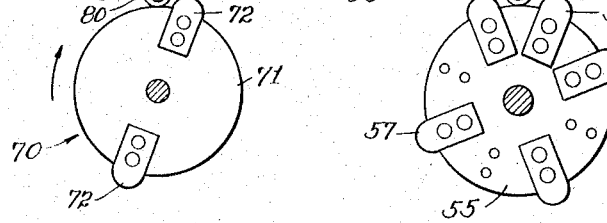
INVENTOR.
Hubert Beddoes
BY
Fidler, Beardsley, Bradley,
Patnaude & Petherbridge Att'ys

United States Patent Office 3,307,579
Patented Mar. 7, 1967

3,307,579
MULTI-WAY INDEXING VALVE
Hubert Beddoes, Chicago, Ill., assignor to Pacific Flush Tank Company, Chicago, Ill., a corporation of Illinois
Filed Apr. 11, 1963, Ser. No. 272,248
9 Claims. (Cl. 137—624.18)

This invention relates to fluid distributing systems and has to do more particularly with a novel fluid distributing valve and novel means for controlling the operation of such valve.

In fluid distributing systems of the type to which the present invention relates, a single supply conduit is provided and is connected to a valve by which the flow of fluid from the supply conduit may be switched successively to each one of a plurality of distributing conduits. The arrangement is such that each distributing conduit is normally connected to the supply conduit for a predetermined period of time after which the valve is actuated and connected to the next distributing conduit. While the invention is not limited to such application, one typical application is that of supplying evolved sludge gas to the contents of a fluid sludge digester under the scum successively at various locations in the digester, the sludge gas being supplied to each location for a predetermined period of time.

Fluid distributing systems are known wherein several valves are provided which are operated automatically to connect the supply conduit successively to each one of a series of distributing conduits. However, such systems require a separate valve for each distributing conduit and consequently are relatively complicated and expensive. It is also known that a single valve can be used to successively connect the supply conduit to each one of a plurality of distributing conduits with a timing arrangement provided so that each distributing conduit is connected to the supply conduit for a predetermined period of time. However, it is not practicable to use such a system except where all of the distributing conduits are to be used in succession. In other words, such a system is not practicable where it is desired to dispense with the use of one or more of the distributing conduits because, even though such conduit is disconnected, the timing arrangement would halt the operation of the distributing valve for a period of time equal to that provided by the system even though the distributing conduit is not connected to the valve and is closed off.

In accordance with the present invention, a fluid distributing system is provided including a supply conduit and a plurality of distributing conduits between which is connected a valve having a single inlet connected to the supply conduit and a plurality of outlets each connected respectively to the distributing conduits, the valve having a valve element which is driven to connect the outlets successively to the inlet, thus distributing the flow of fluid from the supply conduit to the respective distributing conduits in succession. A timing arrangement is provided whereby the supply conduit is connected to each distributing conduit for a predetermined period of time whereupon the flow is switched to the next distributing conduit. Furthermore, the arrangement is such that one or more of the outlets may be closed off without unduly delaying the shifting of the flow between any of the distributing conduits and the next successive distributing conduit.

An object of the present invention is to provide a new and improved fluid distributing system.

Another object is to provide a new and improved fluid distributing valve.

Another object is to provide a new and improved timing control for a fluid distributing valve.

Still another object is to provide a fluid distributing system having a valve adapted to successively connect each of a plurality of outlets to an inlet for predetermined period of time and wherein one or more of the outlets can be closed without substantially increasing the time elapsed between the connecting of any outlet and the connecting of the next succeeding open outlet.

Another object is to provide a simple and inexpensive timing control for a fluid distributing valve adapted to successively connect each of a plurality of outlets to an inlet for a predetermined period of time and wherein manual means are provided for halting the control at a desired time or position.

Another object is to provide a simple and inexpensive timing control for a fluid distributing valve adapted to successively connect each of a plurality of outlets to an inlet and wherein manual means are provided for causing the device to operate continuously, whereby it can be rapidly brought to any desired outlet or conduit and then stopped at such outlet.

Other object and advantages will appear from the following description taken in connecton with the appended drawings, wherein;

FIG. 1 is a somewhat diagrammatic view of the system but omitting the electrical wiring:

FIG. 2 is an enlarged transverse sectional view through the valve;

FIG. 3 is a sectional view taken along line 3—3 of FIG. 2;

FIG. 4 is a face view of the movable valve element;

FIG. 5 is a fragmentary view of a detail;

FIG. 6 is a fragmentary view of a portion of the valve and showing the movable valve element in a different position than in FIG. 3;

FIG. 7 is a somewhat diagrammatic view showing the complete system including the electric wiring; and FIGS. 8 to 11 are somewhat diagrammatic views respectively showing essentially two of the switches in the various positions which they assume during the operation of the valve.

Referring now particularly to FIG. 1, the system generally includes a distributing valve 20, a drive 21 for the valve, a control assembly 22 and the pilot light switch assembly 23. As hereinafter explained, the drive 21 is controlled by the control assembly 22 to normally move the valve element successively from one position to the next and to halt it for a predetermined period in each of its positions to thereby successively connect each outlet to the inlet of the valve.

The valve 20 (FIGS. 2 to 6) includes a casing 25 formed by an annular side wall 26 and end walls 27 and 28 which take the form of circular plates and which are secured to the side wall as by screws 28a to define a chamber 29. An inlet 30 in which is threaded a pipe 30a opens into the chamber 29.

A plurality of outlet ports 35 are provided which lead from the chamber 29 at least some of which are provided with outlet pipes such as the pipes 36a to 36e, respectively. The remainder of the outlet ports 35 are closed by plugs, such as plugs 37a to 37c, respectively. It will be understood that the outlet ports 35 are provided with outlet pipes in accordance with the requirements of the system, and the outlets not needed are plugged. Thus, the number of outlet pipes, and consequently the number of plugs used will vary with the requirements of the system.

A drive shaft 40 extends through the end wall 28 and into the chamber 29 and is journalled in a bearing plate 41 secured to the end wall 28 as by screws 42. The shaft 40 carries an arm 43 which is drivingly connected as by a drive lug 44 to a valve element 45. The valve element 45 is connected to the drive lug 44 as by screws 44a. The valve element 45 is of cylindrical form and fits snugly in the casing and firmly against the inner face of the side wall 26. To this end, the valve element 45 is split as at 46 and is resiliently urged outwardly into engagement with the inner face of the side wall 26.

The valve element 45 is provided with a port 47 of generally oval form and is at least as wide as the diameter of the outlet ports 35. The port 47 is longer in circumferential extent than that of the outlet ports 35 as seen particularly in FIG. 3 and for a purpose which will hereinafter appear. As will appear from the following description, it will be seen that the valve element 45 is halted with respect to each outlet in a first position (FIG. 3) wherein the leading portion of the port 47 registers with the adjacent outlet and in a second position such as shown in FIG. 6 wherein a trailing portion of the port 47 registers with the adjacent outlet port 35.

It will be understood, and as explained more in detail hereinafter, that the valve element 45 is progressively moved circumferentially in the chamber 29 and about its axis to bring the port 47 successively into registry with each of the several outlets 35. The valve element is halted in each such position for a predetermined period of time whereby fluid may flow into the chamber 29 through the inlet 30 and out of the chamber through the port 47 and the adjacent outlet port 35 with which the port 47 is then in registry. As noted above, the valve element 45 is adapted to be positioned in either one of two positions relative to each outlet in both of which positions the port 47 registers with the adjacent outlet.

The valve element 45 is rotated by the motor 21a which is connected through a suitable drive 50 (FIG. 1) such as a double worm and worm wheel arrangement. The exact nature of the drive is not important to the invention, but preferably it is a reducing drive which permits the valve element to be moved slowly by a conventional electric motor. The motor 21a is energized periodically to drive the valve element 45 in a manner which will hereinafter appear.

Carried rigidly on the drive shaft 40 and rotatable therewith is a cam 55 (FIG. 7) which includes a cam plate 56 and a plurality of cam lugs 57 carried thereby. The cam lugs 57 are secured to the cam plate 56 in an arrangement corresponding to the arrangement of outlet pipes leading from the valve casing. For example in the present illustrative example there are five outlet pipes, namely 36a to 36e, respectively, and consequently there are five cam lugs 57 arranged in similar angular arrangement to the outlet pipes. The cam plate 56 preferably is provided with additional screw holes corresponding in location to the plugged outlets 35 of the valve 20 whereby additional cam lugs may be attached to the cam plate 56 when additional outlet pipes are connected to the otherwise plugged outlets.

The cam 55 (FIG. 8) is arranged to actuate a microswitch 60 including a first contactor 61, a second contactor 62 and a movable contactor 63 carrying an actuator 64 having a roller follower 65. The contactor 63 is normally biased to a position closed on the contactor 62, but is moved into position against contactor 61 when any one of the cam lugs 57 engages the follower 65.

A timing cam 70 (FIG. 8) which includes a cam plate 71 and cam lugs 72 is connected to a clock motor 73 (FIG. 7) which may be electrically energized and is adapted to actuate a microswitch 75. The microswitch 75 (FIG. 8) has a first contactor 76, a second contactor 77, and a third contactor 78 carrying an actuator 79 which in turn carries a follower 80. The contactor 78 is normally biased into contact with the contactor 77, but is adapted to be moved into engagement with the contactor 76 when either of the cam lugs 72 engages the follower 80.

Line conductors 90, 91 (FIG. 7) are adapted to be connected to a source of electrical energy. Line conductor 90 is connected to one terminal of the electric motor 21a. The other line conductor 91 is connected, through a circuit hereinafter described, to a conductor 91a connected to a second terminal of the electric motor 21a.

A conductor 92 is connected between the conductor 91a and the movable contactor 63, and the second line conductor 91 is connected to the movable contactor 78.

A conductor 94 connects the upper fixed contact 61 of the switch 60 with the upper fixed contact 76 of the switch 75 and a manually operable switch 95 is connected in this conductor. A conductor 96 connects the lower fixed contact 62 of the switch 60 with the lower fixed contact 77 of the switch 75.

A manually operated switch 110 is connected between the line conductor 93 and the conductor 91a and in parallel with the control switches 60 and 75. Thus when the switch 110 is closed the motor 21a is continuously energized and the valve element 45 is continuously rotated. Under such operating condition the movable valve element 45 is continuously rotated and successively connects the outlets 35 to the valve chamber 29 without halting in any of its several positions. Ordinarily the switch 110 will be left open so that the valve is periodically halted in each position connecting one of the outlet ports 35 to the valve chamber thus providing for a period of flow through that outlet port in excess of the time which would otherwise be provided if the valve were continuously rotated.

A plurality of pilot lights 100 and corresponding microswitches 101 are connected in parallel between the line conductor 90 and the line conductor 91 for indicating the position of the cam 55 at any time and consequently for indicating the particular outlet port 35 which is then connected to the inlet 30. The microswitches 101 are carried by a mounting plate 102 and are arranged in positions corresponding to the positions of the outlet ports 35. A cam arm 103 is carried on the shaft 40 and is adapted to be rotated by the shaft 40 successively into engagement with microswitches 101. Thus, as the shaft 40 is rotated to its successive positions to open an outlet port 35, the corresponding pilot light is energized.

In operation, the clock motor is continually energized to drive the cam 70 slowly so as to close the switch 75 on the upper contactor 76 periodically and to thereafter allow the movable contactor 78 to move into contact with the fixed contactor 77. It will be understood that the showing of the clock motor cam in the drawing is only diagrammatic and that as actually constructed it is such to provide a quick action of the switch contactor 78 from one position to the other with a relatively long period wherein the movable contactor 78 is closed on the fixed contactor 77.

The period that the switch 75 is closed on the contactor 77 preferably is of the order of several hours and, for example, may be between three hours and six hours. The period that the switch is closed on the contactor 76 will be a relatively short period of time such as five or ten minutes. It will be seen from the following description that this period, while on the contactor 77, is the period during which the valve is open to one of the outlet ports 35, during which period the flow of fluid through the valve casing continues to the particular pipe connected to that outlet port. In the particular embodiment shown, the timing clock is arranged to provide an actuation of the switch 75 twice in each twelve-hour period and thus the movable contactor 78 is closed on the contactor 77 for a long time and on the contactor 76 for a short time in a relatively long period of approximately six hours. However, this period may be shortened by adding additional cam lugs 72 to the cam disk 71.

Assuming that the circuit is in the condition shown in FIG. 8, the cam 55 is in a position wherein one of the cam lugs 57 engages the follower 65 of the switch 60 and maintains the movable contactor 63 against the upper fixed contactor 61. The cam 70, on the other hand, is in a position wherein the movable contactor 78 is closed on the lower fixed contactor 77. Thus the circuit through the motor 21a is open and the motor is stopped. In the position of the shaft 40 shown in FIG. 8, the movable valve element 45 is in a position as shown in FIG. 3 and the port 47 registers with the corresponding outlet port 35. Thus there is a flow of fluid through that outlet port 35.

Upon further rotation of the clock motor 73 and the corresponding rotation of the cam 70, the movable contactor 78 is closed on the upper fixed contactor 76 and the motor is energized. This effects rotation of the movable valve element 45 to move the port 47 from its former position toward a new slightly advanced position, and owing to the circumferentially elongated form of the port 47, it remains in registry with the first outlet port 35 during that portion of the movement of the shaft 40 in which the follower 65 is engaged by one of the cam lugs 57; in other words, during the movement from the position shown in FIG. 8 to the position shown in FIG. 10. From the foregoing it will be seen that the motor is energized during the time that the cam lugs 57 and 72 are in engagement with their respective followers 65 and 80 and the two switches 60 and 75 are closed on their upper fixed contacts 61 and 76.

As soon as the follower 65 moves off the lug 57, the movable contactor 63 moves into its position engaging lower fixed contactor 62. As seen in FIG. 10, the circuit to the motor 21a is opened for the reason that the movable contactor 78 is held in engagement with the upper fixed contactor 76. The motor thus is stopped.

However, as soon as the cam lug 72 moves away from the follower 80, the movable contactor 78 is moved into engagement with the lower fixed contactor 77 and the motor is energized to move the movable valve element 45 to its next position wherein the port 47 is opposite the next outlet port 35.

The motor 21a rotates the shaft 40 and consequently the cam 55 (FIG. 11) until the next lug 57 engages the follower 65 and raises the movable contactor 63 into engagement with the fixed contactor 61 to thereby open the circuit and halt the motor. The movable valve element 45 thus is halted with its port 47 registering with one of the outlet ports 35.

It will be seen that as the shaft 40 is rotated the arm 103 is correspondingly rotated so that when the movable valve element 45 is in any of its positions with the port 47 registering with an outlet port 35, the corresponding pilot light 100 is energized and thus indicates the outlet port 35 which is then open.

Should it be desired to retain the movable valve element 45 in any particular position wherein the port 47 is in registry with one of the outlet ports 35 for a longer period than that provided for by the control arrangement, the switch 95 may be opened manually. Thus even though the cam 70 continues to be rotated and moves to a position wherein the movable contactor 78 is engaged with the upper fixed contactor 76, the motor circuit will remain open.

If for any reason it is desired that the valve rotate continuously, the switch 110 is closed which by-passes the switches 60 and 75 and causes the motor 21a to be energized continuously so long as the switch 110 remains closed.

From the foregoing, it will be seen that the apparatus provides for moving the movable valve element into a position wherein the port 47 registers with one of the outlet ports 35, whereupon the movable valve element is halted for a predetermined period of time—for example, several hours—to allow fluid to flow through the valve casing from the inlet 30 to that one of the outlet pipes 36 which is connected to the open outlet port. Thereafter, the motor 21a is energized to rotate the movable valve element 45 to a successive position wherein the port 47 is in registry with the next one of the outlet ports 35 to which an outlet pipe 36 is connected. The location of the switch 95 is such that the valve port 47 cannot stop at any position except in register with an open outlet 35. The period of time during which the movable valve element 45 is moving from one position to its next position is relatively short, for example, generally of the order of a few minutes. Thus the inlet 30 is connected almost continuously to one or the other of outlet pipes 36.

It should be noted at this point that where one or more of the outlet ports 35 is plugged, the cam 55 is not provided with a cam lug or lugs 57 corresponding to such plugged outlet or outlets. Thus, the motor 21a will be operated to rotate the movable valve element from a position wherein the port 47 registers with the next outlet port 35 to which an outlet pipe 36 is connected. In other words, the port 47 will be moved continuously from a first outlet port 35 to the next outlet port to which an outlet pipe 36 is connected and it will thus be moved past any of the outlet ports which are plugged and will not be halted in a position opposite such outlet port.

I claim:

1. For use in a fluid distributing system, the combination of a valve casing having an inlet and a plurality of circumferentially spaced outlets, a valve element having a port connected to said inlet and rotatable in said valve casing into positions registering said port with said outlets successively, said valve element port and said outlet being constructed to permit full flow for a predetermined angular movement of the valve element, an electric motor drivingly connected to said valve element for rotating the latter, means for connecting said motor to a source of electric power including first and second conductors connected respectively to said motor, said first conductor also being connected to one side of said electric power source, a first, single pole, double-throw switch having first and second, fixed contactors and a third contactor connected to said second conductor, and movable selectively into positions engaging said fixed contactors respectively, and normally engaging said second contactor, a second, single pole, double-throw switch having first and second, fixed contactors connected respectively to the first and second contactors of said first switch, and a third contactor connected to the other side of said source of power and movable selectively into positions engaging said fixed contactors of said second switch respectively, and normally engaging said second contactor thereof, means connected to said valve element for controlling said first switch to close the third contactor thereof on the first contactor thereof when said valve element is in a position with said port registering with an outlet and to close the third contactor of said first switch on the second contactor thereof when said valve element is in positions between said port registering positions, and means for periodically closing the third contactor of said second switch on said first contactor of said first switch.

2. A combination according to claim 1 wherein said last means is operative to close said third contactor of said second switch on said first contactor thereof at intervals which are shorter than those during which said third contactor of said second switch is closed on said second contactor thereof.

3. For use in a fluid distributing system, the combination of a valve casing having an inlet and a plurality of circumferentially spaced outlets and a valve element having a port connected to said inlet and rotatable in said valve casing into positions registering said port with said outlets successively, said valve element port and said outlet being constructed to permit full flow for a predetermined angular movement of the valve element, an electric motor drivingly connected to said valve element for rotating the latter, the combination of means for connecting said electric motor to a source of electric power including first and second conductors connected respectively to said motor, said first conductor also being connected to one side of said electric power source, third and fourth conductors, first means including a first switch for connecting said second conductor selectively to said third or fourth conductors, second means including a second switch for connecting said second conductor selectively to said third or fourth conductors, said first means and said second means being effective to connect said second conductor to the other side of said electric power source when both said first and second switches are normally open or normally closed, means driven by said motor for maintaining said first switch in a normally open condition only when said valve element is in position wherein said port is in registry with one of said outlets and means for periodically actuating said second switch means to said normally open position.

4. For use in a fluid distributing system the combination of a valve casing having an inlet and a plurality of circumferentially spaced outlets and a valve element rotatable in said casing and having a port of greater circumferential length than said outlets, means for automatically indexing said valve element to sequentially connect said port to each outlet comprising first means for moving said valve element through a relatively small angle whereby said port remains in registry with a first one of said outlets during such movement and a second means for moving said valve element thereafter through a greater angle than said first movement whereby said port is moved out of registry with said first outlet and into registry with the next succeeding outlet, said first and second means being constructed so that each outlet remains connected to said port for a predetermined time.

5. A fluid distributing valve for controllably supplying sludge gas to each of a plurality of locations in a fluid sludge digester for a predetermined period of time, comprising a valve casing defining a valve chamber having end walls and a cylindrical side wall, at least one of said end walls having an inlet opening into said chamber for supplying gas thereto, and said cylindrical wall having a plurality of circumferentially spaced circular outlets leading from said chamber for controllably supplying said gas to each of said locations, and a hollow cylindrical valve element rotatably disposed in said chamber and having its interior communicating with said inlet and an elongated port leading from the interior and positioned to be moved into registry successively with said outlets as valve element is rotated in said valve casing, said elongated port having a substantially greater dimension in said circumferential direction than the diameter of said outlets, an electric motor drivingly connected to said valve element for rotating the latter, means for connecting said electric motor to a source of electric power including first and second conductors connected respectively to said motor, third and fourth conductors, first means including a first switch for connecting said second conductor selectively to said third or fourth conductors, second means including a second switch for connecting one terminal of said source of power selectively to said third or fourth conductors, said first means and said second means being effective to connect said second conductor to said source of power when both said first and second switches connect either said third conductor or said fourth conductor to said second conductor and said source of power respectively, means driven by said motor for connecting said third conductor to said second conductor when said valve element is in position wherein said port is in registry with one of said outlets and connecting said fourth conductor to said second conductor when said valve element is in a position wherein said port is not in registry with an outlet and means for periodically connecting said source of power first to said third conductor and then to said fourth conductor.

6. The invention claimed in claim 4 wherein said valve element is a hollow cylinder split longitudinally and urged outwardly by its own resilience into engagement with the inner wall of said casing.

7. The invention claimed in claim 4 further comprising manual means for halting said valve element in any selected one of its several positions independently of said first and second means.

8. The invention claimed in claim 4 further comprising manual means for disabling said means for automatically indexing said valve element, whereby said valve element is moved continuously to cause said port to successively register with said outlets.

9. The invention claimed in claim 4 wherein
said inlet is connected to a source of evolved sludge gas, and
said outlets are respectively connected to a plurality of locations in a sludge digester.

References Cited by the Examiner
UNITED STATES PATENTS

| | | | |
|---|---|---|---|
| 2,768,137 | 10/1956 | Schlenz | 210—13 XR |
| 2,806,486 | 9/1957 | McDonald | 137—624.13 |
| 2,919,764 | 1/1960 | Dillman | 137—625.11 XR |
| 2,994,814 | 8/1961 | Griswold | 318—467 |
| 3,000,398 | 9/1961 | Link | 137—625.11 XR |
| 3,056,426 | 10/1962 | Hauser | 137—625.11 |
| 3,096,787 | 7/1963 | Kayler | 137—624.13 |
| 3,096,788 | 7/1963 | Talbot | 137—625.11 |
| 3,098,960 | 7/1963 | Huska | 318—443 |

FOREIGN PATENTS

| | | |
|---|---|---|
| 284,372 | 5/1915 | Germany. |

ALAN COHAN, *Primary Examiner.*

ISADORE WEIL, WILLIAM F. O'DEA, *Assistant Examiners.*